Aug. 8, 1967  R. L. WHITELAW  3,334,647

TWO-WAY VALVE

Filed April 15, 1965

INVENTOR.
Robert L. Whitelaw
BY
Paul Fitzpatrick
ATTORNEY

United States Patent Office 3,334,647
Patented Aug. 8, 1967

3,334,647
TWO-WAY VALVE
Robert L. Whitelaw, Indianapolis, Ind., assignor to General Motors Corporation, Detroit, Mich., a corporation of Delaware
Filed Apr. 15, 1965, Ser. No. 448,351
3 Claims. (Cl. 137—219)

The invention described herein was made in the course of, or under, a contract with the United States Atomic Energy Commission.

My invention is directed to a valve, particularly to a two-way valve suited for rather large gas flows. The valve according to the invention has numerous advantages including compactness relative to its capacity, low pressure drop, lightweight, low friction, essentially only one moving part actuated linearly, and a structure having circular symmetry.

The nature of my invention and its advantages will be clearly apparent to those skilled in the art from the succeeding detailed description of the preferred embodiment of the invention and the accompanying drawings thereof.

Figure 1:
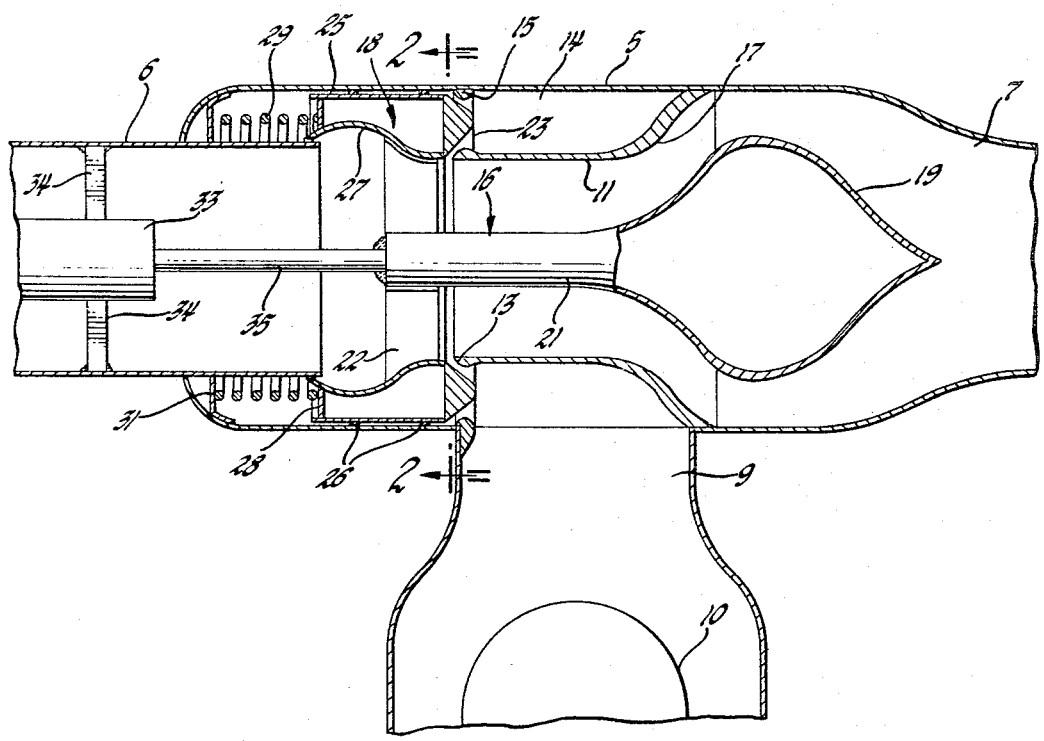
FIGURE 1 is a longitudinal sectional view of a valve.
Figure 2:
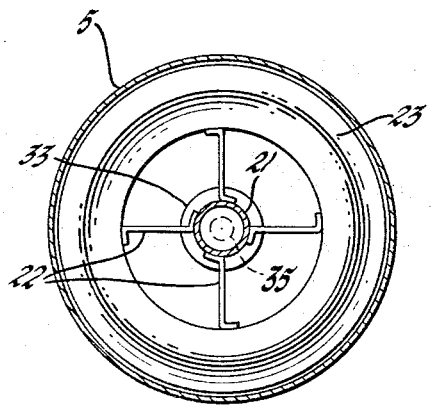
FIGURE 2 is a cross section taken on the plane indicated by the line 2—2 in FIGURE 1.

As will be explained more fully, the valve illustrated comprises a body having circular symmetry with an inlet, an outlet coaxial with the inlet, and a radial outlet. It embodies an annular or ring-shaped plug and a bulbous plug, these cooperating alternatively with seats in the body to direct the flow to either outlet or divide it between the outlets.

The particular valve described here is intended for use in a regenerative gas turbine power plant to direct the air flow from the compressor through the regenerator or directly to the combustion apparatus of the power plant. Of course, the valve structure is suitable for other uses.

Referring particularly to the drawings, the valve comprises a generally cylindrical body 5 having an inlet defined by a conduit 6 coaxial with the body. The downstream end of the body tapers to a first outlet 7 coaxial with the inlet. A second outlet 9 extends laterally from the mid-portion of the body. As illustrated, the outlet 9 leads into a combustion apparatus including a combustion chamber 10. Outlet 7 leads to a regenerator (not illustrated).

The body mounts a coaxial shroud 11 which extends from the body adjacent the downstream edge of outlet 9 and continues to a frusto-conical seat 13 upstream of the outlet 9. The body and shroud define a passage 14 leading to the outlet 9. The upper end of this passage is defined by seat 13 and by a second annular seat 15 on the interior of the body, preferably coaxial and coplanar with seat 13. The diverging portion of the shroud 11 defines a seat 17.

The valve seats referred to are engaged by a reciprocable valve member 16, including a ring-shaped plug assembly 18 which cooperates with seats 13 and 15 and a bulbous plug 19 which cooperates with seat 17. Plug 19, which is streamlined, is integral with a hollow stem 21 which is supported by struts 22 from the structure of the first plug assembly 18. The plug assembly 18 comprises a valve member 23 which may simultaneously engage the seats 13 and 15. As illustrated, the member 23 is slightly spaced from the seats to provide a restricted passage into outlet 9. The ring 23 is fixed to a cylindrical guide 25 having bearing rings 26 slidable in the interior of the body. The plug assembly also comprises an inner shroud 27 fixed to the inner edge of ring 23 and an annular plate 28, these being fixed together to define a lightweight hollow annular body. The struts 22 are welded or otherwise fixed to the shroud 27. Thus, the two valve plugs are supported in the casing by the bearing rings 26 for reciprocating movement to engage the seats.

A spring 29 acts between the ring 28 and an abutment 31 fixed between the body 5 and the inlet conduit 6. The inlet conduit 6 extends within the shroud 27 to provide a smooth gas path and to shield spring 29. This spring is an optional feature which may be omitted if not needed.

The valve member 16 is moved by any suitable actuator such as that indicated by numeral 33. Actuator 33 may be of any suitable type such as a hydraulic piston and cylinder or motor and screwjack. The actuator 33 is mounted centrally in the inlet conduit by radial struts 34 and is connected to the movable valve member by a rod 35 fixed to the stem 21.

The operation of the mechanism should be obvious but may be outlined briefly. The valve is shown substantially fully open to outlet 7 and only slightly open to outlet 9. By moving valve member 16 to the left, outlet 9 is further opened and outlet 7 is throttled and may be entirely closed if plug 19 is seated against downstream seat 17. In this position the flow path to outlet 9 is relatively open and free. If the valve is moved to the right, plug 23 may seat, closing off outlet 9, and the streamlined plug 19 provides smooth flow from the inlet to the outlet 7, with a minimum pressure drop.

It will be seen from the foregoing that the valve structure is simple and capable of handling large flows with low pressure drops in a compact and lightweight structure.

The description of the preferred embodiment of the invention to explain the principles thereof is not to be considered as limiting the invention, since many modifications within the scope of the invention may be made by the exercise of skill in the art.

I claim:
1. A two-way valve comprising, in combination,
   a body having an inlet at one end, a first outlet at the other end, and a second outlet opening from the side of the body,
   a shroud extending from the body between the outlets and extending toward the inlet, the shroud defining a first valve seat at its upstream end and a second valve seat adjacent its downstream end,
   the body defining a third valve seat adjacent the first valve seat,
   the body and shroud defining between them a passage extending from between the first and third seats communicating with the second outlet,
   a reciprocable valve member cooperating with the seats and adapted to alternatively close the outlets, the valve member comprising
   a first plug slidable in and guided by the body upstream of and engageable with the first and third seats, the plug having a central opening connecting the inlet to the interior of the shroud,
   a second plug downstream of and engageable with the second seat, the second plug being supported by and movable with the first plug,
   and means for reciprocating the valve member,
2. A two-way valve comprising, in combination,
   an annular body having an inlet at one end, a first outlet at the other end coaxial with the inlet, and a second outlet opening from the side of the body,
   an annular shroud extending from the body between the outlets and extending toward the inlet, the shroud defining a first valve seat at its upstream end and a second valve seat adjacent its downstream end,
   the body defining a third valve seat adjacent the first valve seat, the body and shroud defining between them a passage extending from the first and third valve seats to the second outlet, a reciprocable valve member cooperating with the seats and adapted to alternatively close the outlets, valve member comprising a first plug slidable in and guided by the body upstream of and engageable with the first and third seats, the plug having a central opening connecting the inlet to the interior of the shroud, a second plug downstream of and engageable with the second seat, the second plug being supported by and movable with the first plug, and means for reciprocating the valve member.

3. A two-way valve comprising, in combination, an annular body having an inlet at one end, a first outlet at the other end, and a second outlet opening from the side of the body, an annular shroud extending from the body between the outlets and extending toward the inlet, the shroud defining a fixed valve seat at its upstream end and a second valve seat adjacent its downstream end, the body defining a third valve seat adjacent the first valve seat, the body and shroud defining between them a passage communicating with the second outlet, a reciprocable valve member cooperating with the seats and adapted to alternatively close the outlets, the the valve member comprising a first plug assembly including a guide slidable in and guided by the body and a plug mounted on the guide upstream of and engageable with the first and third seats, the plug having a central opening connecting the inlet to the interior of the shroud, a second plug downstream of and engageable with the second seat, the second plug being supported by and movable with the first plug and defining a passage between the shroud and the plug, and means for reciprocating the valve member.

No references cited.

M. CARY NELSON, *Primary Examiner.*

J. R. DWELLE, *Assistant Examiner.*